United States Patent [19]
Matsukata

[11] 3,934,884
[45] Jan. 27, 1976

[54] PRECISION PIECE SELECTOR ON GRAMAPHONE RECORD

[76] Inventor: Kosuke Matsukata, 390 Tsurumi-cho, Tsurumi, Yokohama, Kanagawa, Japan

[22] Filed: June 7, 1974

[21] Appl. No.: 477,504

[30] Foreign Application Priority Data
June 8, 1973 Japan.................................. 48-63859

[52] U.S. Cl............................. 274/9 RA; 274/13 R
[51] Int. Cl.².......................................... G11B 3/00
[58] Field of Search....... 274/9 RA, 13 R, 14, 15 R, 274/15 A, 20, 21

[56] References Cited
UNITED STATES PATENTS

| | | | |
|---|---|---|---|
| 2,243,126 | 5/1941 | Routin | 274/14 |
| 2,256,579 | 9/1941 | Routin | 274/14 |
| 2,917,930 | 12/1959 | Sherwood | 274/13 B |
| 3,516,175 | 6/1970 | Kobler et al. | 274/14 |
| 3,610,638 | 10/1971 | Castagna | 274/14 |

Primary Examiner—Richard E. Aegerter
Assistant Examiner—Steven L. Stephan
Attorney, Agent, or Firm—Wenderoth, Lind & Ponack

[57] ABSTRACT

A generally comb shaped apparatus having a slot on one end to engage the center spindle of a record player, and having teeth that engage a tone arm to help position the tone arm to select a particular song from a record album.

4 Claims, 17 Drawing Figures

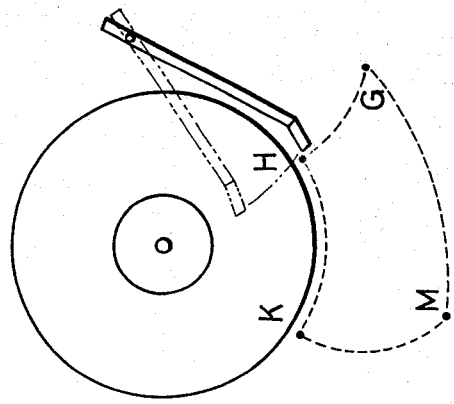
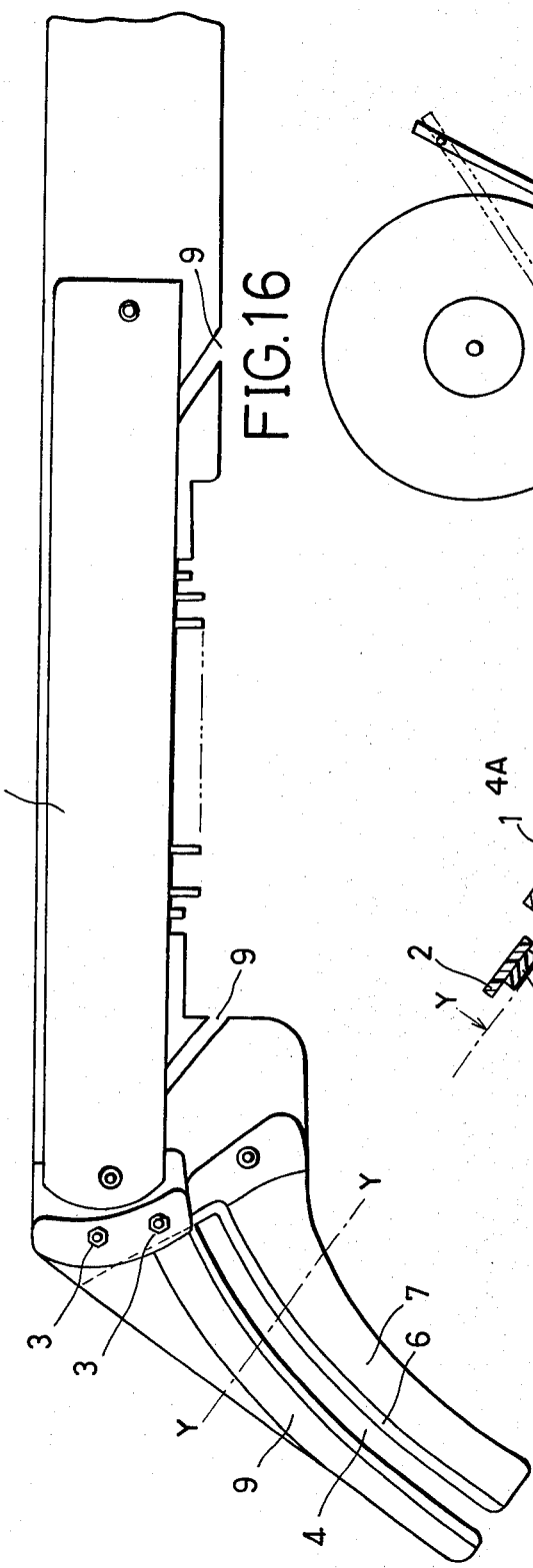

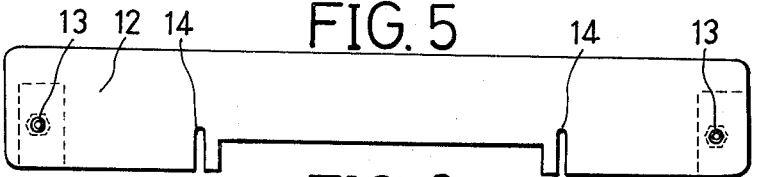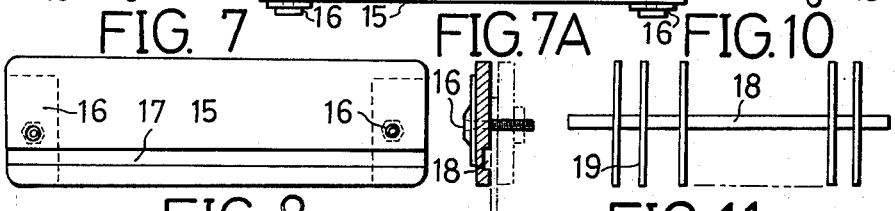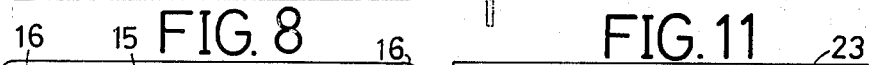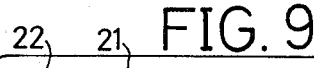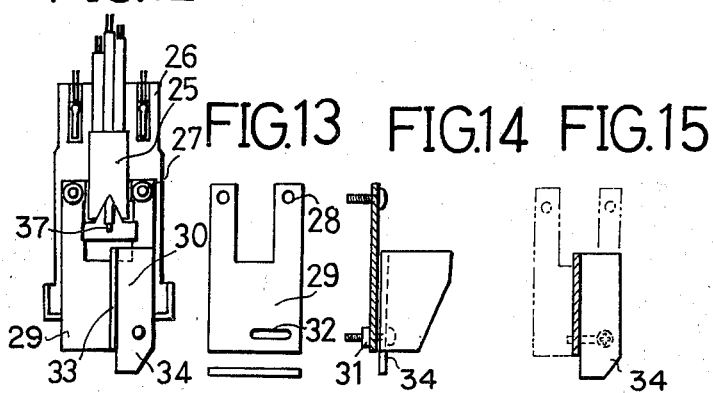

PRECISION PIECE SELECTOR ON GRAMAPHONE RECORD

BACKGROUND OF THE INVENTION

Conventional gramaphone record players can deal with three sizes of record namely 12 (30 cm), 19 (25.4 cm) and 7 (17.5 cm) inches in diameter. At recent music shops 10 inch records are hardly seen and even 7 inch records are not given so much publicity at the floor as in the past. On the contrary, 12 inch records occupy major portion of floor. While 7 inch records are still being used for regular Juke Box, on 12 inch records, short pieces of music as much as 14 pieces are recorded on one side in these days. The reason for this popularity of 12 inch record may be due to high degree of fidelity to the original now demanded by record fans. Music recorded on small diameter record is apt to be distorted as it approaches the center of disque. Further mechanical improvements achieved in recording machine enable precision recording in closely positioned neighbouring grooves of spiral. While realizing difficulties foreseen in some respects for increasing diameter of record beyond 12 inches (30 cms) of present day, no body can deny possibility of enlargement to 14 inches (35 cms) or more as in the case of computer's magnetic discs. When such record is realized, higher degree of fidelity can be enjoyed beside increased number or longer pieces recorded in one record.

Under such circumstances, selection of pieces recorded on one side of record as the record fans wish, is therefore immediate demand to be met by makers of players and record manufactures alike. Unfortunately, players are handled by mechanical engineers while records are by plastic engineers. They are independent to each other in the field of business and engineering. Further record fans have been accustomed to think that in order to select piece of their choice on record, visionary effort is necessary behind manual manipulation of tone arm to place the tone arm at the right spot on record. Besides, any electric contrivances in the near position of pick up stylus create flux distortion causing magnetic disturbances prejudicing high fidelity of sound produced. These considerations left this delicate part of undeveloped technique in position of no-man's land neglected by makers of players and record manufactures alike.

In some field of engineering mechanical precision is more complete and near-perfect than electrical contrivance especially, so when time necessary for its manipulation can be overlooked to certain extent. Recent high standard of record cutting allows to neglect horizontal deviation of course traced by stylus to the extent of the width of boundary space zone between two neighbouring music pieces on record. This means this space can absorbe the above referred horizontal deviation of tracing of stylus. Therefore, if stylus can be placed in this space with precision possible with the present technique, stylus can play the selected piece right from the beginning of piece. This precision technique is now achieved by this invention in view so that any music piece out of as many as 14 pieces on one side of record can be selected and such piece can be repeated as many as record fan can wish and further in case record changer is used any piece out of many records in stack on turn table can be selected without possibility of access to end of each record which is difficult to see.

SUMMARY OF THE INVENTION

Two centers must be first considered, namely that of center spindle of turn table and that of tone arm. Accordingly two circles, having differently positioned centers must be dealt with. To coordinate working of these fixed centers one traveling center having radius in form of music piece selecter stick, is established on piece selector stick which may be referred to later. Grooves of record are made to make spiral circle around the center spindle and stylus of cartridge once placed on this grooves follows these grooves until the end of the spiralled grooves. Different pieces having different music in general are separated by boundary zone of unrecorded grooves. Due to having different centers of circles, horizontal movement by stylus of tone arm on record is not a straight line and it is an arc. However it is now found this arc can be replaced by combination of straight line and arc starting from center spindle of turn table having radius equivalent to distance between two fixed centers referred to above, the former starting from stylus of tone arm to center spindle of turn table and, the latter starting from center spindle of turn table.

These essentials are combined in form of piece selector stick manually rotating around center spindle of turn table. Along the straight line boundary grooves zone between different pieces on record are indicated by protruding needles on the rotating stick. On the other hand, guide attachment indicating the position of stylus is attached to cartridge at the end of tone arm. This attachment is fixed to cartridge by two stud bolts which are internationally employed in any of cartridges on the market. The piece selector stick is made to rotate manually with its arc groove with center spindle of turn table sliding therein and indicating needles on straight line on selector needle holder of piece selector stick, closely contacting the guide attachment of cartridge on the tone arm raised by the tone arm actuator lever. When end of arc groove of the stick, reaches center spindle, the tone arm is now above right position for selected piece boundary. The stick is now disconnected and freed from the center spindle and tone arm, by moving the stick away from two essentials, outwardly. The tone arm is now lowered by tone arm actuator lever on the moving record and soon stylus enters music groove zone of record moving with turn table.

This following is a description of one embodiment of the invention, reference being made to the accompanying drawings in which:

FIG. 4 shows bottom view of piece selector.

FIG. 5 shows top view of radial adjuster of selector needles.

FIG. 6 shows side view of the same shown by FIG. 5 with selector needle holder in its position.

FIG. 7 shows base plate of selector needle holder.

FIG. 7A shows side view of the same shown in FIG. 7 with the top cover in position.

FIG. 8 shows the top view of base plate of selector needle holder with needle setter in groove.

FIG. 9 shows top cover plate of selector needle holder indicating position of needles for selected music pieces on record.

FIG. 10 shows needle setter with needles in position.

FIG. 11 shows how needles are fixed to the body of needle setter on the record in transparent jacket.

FIG. 12 shows general view of bottom view of cartridge with stylus indicator attachment showing two internationally recognized stud bolts holes.

FIG. 13 shows top view of base board of stylus indicator attachment.

FIG. 14 shows side view of stylus indicator attachment proper fixed to its base board of stylus indicator attachment.

FIG. 15 shows top view of that of FIG. 14.

FIG. 16 shows trace of working of handle bar of piece selector in relation to turn table and tone arm.

Figure 2:
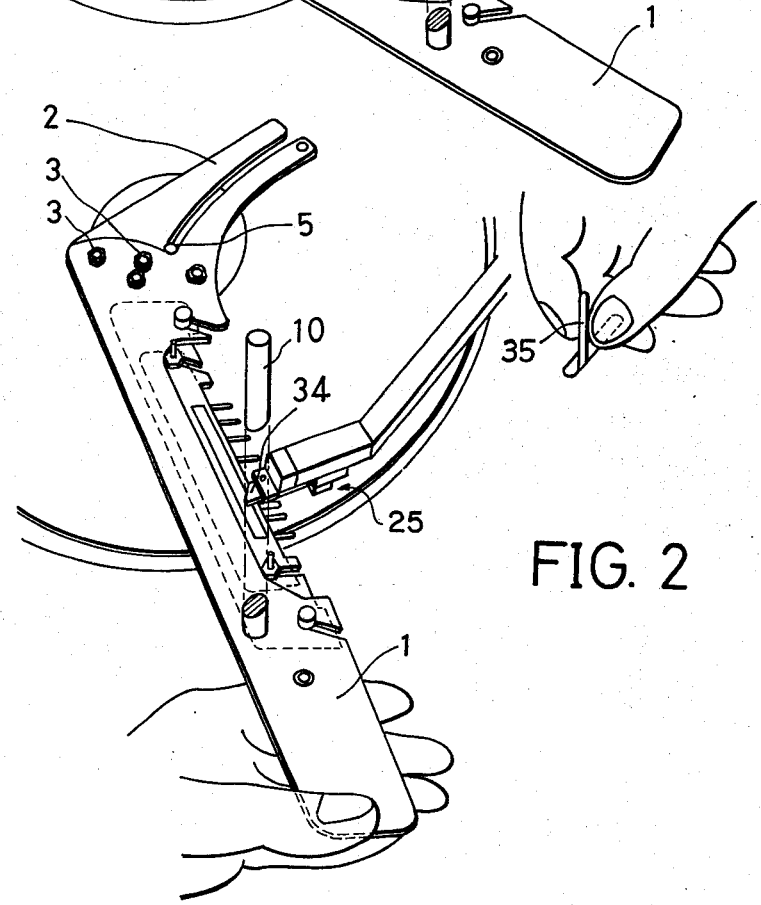
FIG. 2 shows another perspective view of the same ready for lowering the tone arm by tone arm actuator lever on moving record in one hand after the stick is moved outwardly in the other hand.
Figure 3:
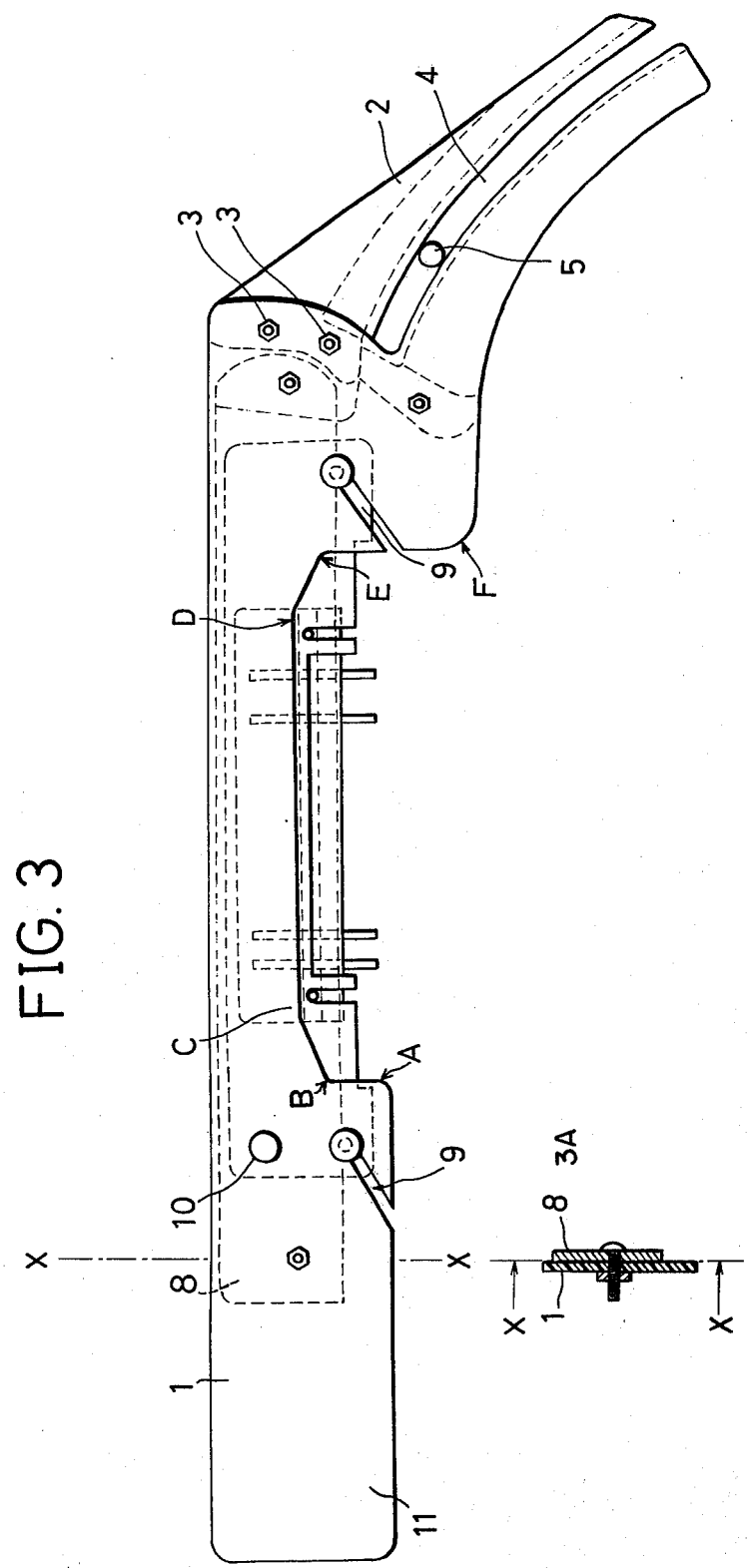
FIG. 3 shows top view of piece selector.

Reference is now made to FIGS. 3 and 4. Piece selector stick is principally made of two pieces of plastic board of moderate thickness 1, 2, both joined together by two bolts and nuts 3, 3. When these pieces 1, 2 are joined, between them arced opening 4 is provided. The center spindle 5 of turn table is guided along this opening 4 when piece selector stick is pressed towards the center spindle 5. Along the opening 4, step lining 6 is created so that center spindle 5 is ensured always to be guided by piece selector stick 1. Next to this step lining 6, synthetic rubber sheet pad 7 in FIG. 4, which is a little thicker than step lining 6, is grued directly to piece selector 1 so that record surface can not be damaged. Another protection of record surface is shown in detachable protector 8 made of synthetic rubber sheet or thin board covered by cloth. Further on the surface of piece selector stick 1, there are formed two grooves cut 9 inclined to take in radial adjuster of selector needle holder of FIG. 5 which will be explained later. Piece selector stick 1 is cut out along A, B, C, D, E and F so that needles of needle setter of FIG. 8 are placed in position which will be later explained. Piece selector stick 1 is handled by holding the straight end 11 with left hand as shown in FIG. 2 or by vertical column handle 10 to be gripped with the same hand (not shown).

Reference to FIGS. 5 through 10 is now made.

Radial adjuster of selector needle holder 12 of FIG. 5 has near its longitudinal ends, stud bolts 13, 13 which slide along grooves 9, 9 of piece selector stick 1. From the nature of slanted grooves 9, by moving the stud bolts 13, 13 along the groove 9, it can adjust its orientation radially as well as tangentially to record. But radial adjustment is the principal working effect mostly utilized. In turn radial adjuster of selector needle holder 12 provides toward the center, two transversal 14, 14 which will take selector needle holder's 15 stud bolts 16, 16 which accommodate needle setter 18 in its longitudinal groove (17). Needles 19 of thin wire, eg. copper or stainless steel wire are positioned by being glued or otherwise, along its length indicating boundary space zone in front of music pieces on record. It is expected that when this invention is made available in music shops, this needles may be intergrated to longitudinal body of needle setter 18 in one piece. As shown in FIG. 8, needle setter 18 is set in groove 17 of base plate of selector needle holder 15. Needle setter 18 can slide along groove 17 to be adjusted later. Top cover plate 21 as shown in FIG. 9 is placed in position on base plate of selector needle holder 15 through holes 22 provided thereon. On this cover plate 21 label 23 or otherwise is provided to identify position of each needle 19 which can be conveniently used when piece selector stick is placed on record for its working. Although it is expected that a set of two needle setter 18 for two sides of record is to be provided by gramaphone record manufactures which produce record, it is advisable that for big library of old records in the hand of record fans, this needle setter can be prepared for their own usage. FIG. 11 shows how this can be done conveniently. In order to protect record, record is now placed in thin transparent plastic jacket 23 generally accompanying a record and main plastic body of needle setter 18 is temporarily placed on it, radially coincidedly with radius of record inside the jacket 23. Adhesive tape 24 may be temporarily employed for holding needle setter 18 in right position on plastic jacket 23. Needles 19 are placed on boundary space zone and glued on to needle setter 18.

Reference is now made to FIGS. 13 through 15. In FIG. 12, cartridge 25 is interchangeably fixed to plug-in-head 26 of tone arm by two stud-bolts 27. These stud-bolts 27 are international. Therefore, it cartridge attachment 29 is provided with equivalent holes by which cartridge attachment 29 is held to cartridge 25 there will be no difficulty for this invention to be adopted to any player. In order to indicate the position of stylus, supplementary cartridge attachment 30 is in turn fixed to cartridge attachment 29 by a set of bolt and nut through adjustable transverse opening 32. The side 33 is the guide on which needle 19 of needle setter of FIG. 10 depends to place the tone arm in position. The side 33 is in line with the outer circumference of stylus 34. This side 33 is at right angle to horizontal plane of cartridge attachment 29. The protruding end 34 of supplementary attachment 30 is guide stopper for tone arm when it is in contact with needle 19 of needle setter 18.

In operation, turn table is first energized to rotate and tone arm is raised by tone arm actuator lever 35 with right hand either by holding the end 11 of piece selector stick 1 by left hand or gripping vertical column handle 10 by the same hand, and then insert it inward towards center spindle of turn table, piece selector stick 1 thus placing center spindle 5 within the opening end of groove at the far end of arc 4 of piece selector stick 1. Meanwhile the piece selector stick 1 is turned towards the cartridge 25 of freed tone arm and then place required needle 19 of needle setter in piece selector stick 1 in close contact with the side 33 to be in line with the stylus 34 of cartridge 25 by lowering arm actuator lever 35 with right hand to the extent that protruding end 34 of supplementary attachment 30 hardly touches top cover plate 21 of selector needle holder 15. By moving the piece selector stick 1 along the arc of groove 4 while pressing the tone arm sidewise maintaining contact between the piece selector and tone arm, the stylus 34 is now placed above the required boundary zone preceding the selected music piece. Then selector stick 1 is now freed from the tone arm by rotating at center spindle clockwise and drawn out from center spindle. The movement of vertical column handle 10 near end 11 of piece selector stick is shown in FIG. 16. By use of this handle 10, it is now shown that this invention provides one travelling center coordinating workings of fixed centers of turn table and tone arm. At point G of cycle, piece selector stick contacts tone arm while groove at the far end of arc thereof takes in center spindle 5. At point H, where groove at its base end is in close contact with center spindle. Stylus 34 of tone arm is now placed above the required position and then piece selector stick is rotated clockwise quetly until point K and drawn out to point M where piece selector stick is completely freed. Meanwhile tone arm is quietly lowered by tone arm actuator lever 35 onto the required piece boundary zone preceding required music piece groove. If next selection of music piece is to be played, selector stick 1 may be moved toward point G for another cycle.

I claim:

1. An apparatus for precisely locating a selection on a phonograph record which has boundary zone grooves between the selections on the record and which is to be played on a record player having a rotating turntable, a spindle in the center of the turntable for centering and holding the record on the turntable, and a tone arm pivoted on an axis having a cartridge with a playing stylus secured thereto which may be manually positioned on the record on the turntable, said apparatus comprising:

piece selector means radially extending above and across the surface of the record player for slidably fitting around the spindle on the turntable, said piece selector means comprised of:

a flat positioning bar having a straight portion and a portion angled from the straight portion, the angled portion having a groove therein removably and slidably fitted around the spindle on the turntable, and the straight portion radially extending above and across the record and having a cut out portion in the side thereof facing against the rotational direction of the turntable and two parallel angled slots, one slot on each side of the cut out;

radial indication means removably connected to the said piece selector means between said piece selector means and the turntable for indicating the position of the boundary zones between the selections of the record when said piece selector means is fitted about the spindle, said radial indication means comprised of:

a radial adjustment plate beneath said positioning bar having a cut out in the side thereof opposing the rotation of the turntable and having two parallel slots perpendicular to the edge of the bar, one slot on each side of the cut out;

two bolts attached to said radial adjustment plate and fitted into the parallel angled slots of said positioning bar, whereby said radial adjustment plate is attached beneath said positioning bar;

a bottom plate below the radial adjustment bar having a groove therein running the length of the plate;

a needle setter rod removably fitted into the groove in said bottom plate;

boundary zone pins perpendicularly attached to the top of the needle setter rod at positions corresponding to the boundary zones on the phonograph record;

a top plate between said bottom plate and needle setter rod and the radial adjustment plate; and two bolts removably fitted through said base plate, said top plate, and the two parallel slots in the radial adjustment plate, whereby the top plate, the bottom plate, and the needle setter rod thereinbetween are operatively connected to said positioning bar; and cartridge guide means fitted to the tone arm for guiding the cartridge and the tone arm into the desired position in said radial indication means and for supporting the cartridge and tone arm thereon, said cartridge guide means comprised of:

a cartridge plate attached between the tone-arm, and a supplemental cartridge plate fastened to and beneath said cartridge plate toward the free end of the tone-arm for positionig adjacent the boundary zone pin indicating the desired location on the record.

2. An apparatus as claimed in claim 1 wherein said piece selector means is further comprised of a lifting means attached to the straight portion of the positioning bar for lifting and positioning the positioning bar around the center spindle and above the record surface.

3. An apparatus as claimed in claim 1 wherein the longitudinal groove in the angled portion of the positioning bar is arched in a semi-circular configuration, said arch shape being part of the circumference of a circle whose radius equals the distance between the stylus and the axis of the tone-arm.

4. An apparatus as claimed in claim 1, wherein said cartridge is bolted to said tone arm, and said cartridge plate is bolted to the cartridge by the bolts securing the cartridge to the tone-arm.

* * * * *

UNITED STATES PATENT OFFICE
CERTIFICATE OF CORRECTION

Patent No. 3,934,884　　　　　　　　　Dated January 27, 1976

Inventor(s)　Kosuke Matsukata　　　　　Page 1 of

It is certified that error appears in the above-identified patent and that said Letters Patent are hereby corrected as shown below:

On the cover sheet, the ABSTRACT should appear as shown on the attached sheet.

Column 1, line 6, beginning with "Conventional gramaphone" cancel all to and including "point G for another cycle." in column 5, line 11, and insert the matter as shown on the attached sheets.

Signed and Sealed this

*thirteenth* Day of *April 1976*

[SEAL]

Attest:

RUTH C. MASON
*Attesting Officer*

C. MARSHALL DANN
*Commissioner of Patents and Trademarks*

ABSTRACT

An apparatus for positioning the tone-arm and stylus of a record player onto a desired boundary zone between selections of a phonograph record. The apparatus utilizes a piece selector stick with a grooved, angled end portion adapted to slide along the center spindle of the record player; a selection indicator which indicates the position of the boundary zones between the selections on the phonograph record, which is changeable for each record, and which is removably fitted to the selector stick; and a guide attachment which is attached to the end of the tone-arm for directing and retaining the tone-arm in the proper position on the selection indicator, so that the tone-arm may be positioned above the boundary zone preceding the desired selection on the record by moving the piece selector stick along the spindle of the record player.

Patent No. 3,934,884

BACKGROUND OF THE INVENTION

Conventional record players can play three sizes of records, namely 12 (30cm), 10 (25.4cm) and 7 (17.5cm) inches in diameter. Nowadays 10 inch records are hardly seen, and even 7 inch records are not given as much publicity as in the past. Today, 12 inch records occupy a major portion of the market, while 7 inch records are still being used for regular Juke Boxes. The reason for this popularity of the 12 inch record may be due to the number of selections which may be recorded on one record and the high degree of fidelity possible with the 12 inch records. Music recorded on smaller diameter records is apt to be distorted as the needle approaches the center of the disc, however, further mechanical improvements achieved in the recording machine have enabled precision recording in closely positioned neighboring grooves of the recording spiral. While foreseeing difficulties in some respects in increasing the diameter of records beyond the 12 inches (30cm) of the present day, nobody can deny the possibility of the enlargement to 14 inches (35cms) or more as is the case of the computers' magnetic discs.

When such a record is realized, a higher degree of fidelity will be enjoyed besides increasing the number or length of selections possible on one record, but there will be many problems to overcome. The ability to easily select the desired pieces recorded on one side of the record is one demand to be met by both the makers of the record players and the record manufacturers. Unfortunately, record players are handled by mechanical engineers and records are controlled by plastics engineers, and each is independent of the other in the fields of business and engineering. A further problem is that listeners have become accustomed to thinking that in order to make a selection on a record, visual effort and manual positioning are necessary to place the tone-arm on the right spot on the record. Finally, any electrical apparatuses near the pick-up stylus will create a flux distortion causing magnetic disturbances, thereby prejudicing the high fidelity of the sound produced. These circumstances have left this delicate area undeveloped and in a no-man's land position, neglected by both the makers of the record players and record manufacturers.

In some fields of engineering, mechanical precision is more complete than electrical contrivance, especially when the time necessary for its manipulation can be overlooked to a certain extent. Recent high standards of record cutting permit neglecting the horizontal deviation of the course traced by the stylus to the extent of the boundary space zone between two neighboring musical selections on the record. This means that this space can absorb the above-referred to horizontal deviation of the tracing of the stylus. Therefore, if the stylus can be placed in this space with the precision possible with the present techniques, the stylus can play the selection right from the beginning. This precision placing of the stylus is now achieved by this invention, so that any musical selection out of as many as 14 selections on one side of a record can be selected, and the selection can be repeated as often as the listener wishes. Where a record changer is used, any selection out of the many records in the stack on the turntable can be selected without requiring access to the end of each record which is difficult to see.

SUMMARY OF THE INVENTION

Two centers must first be considered, the center of the turntable defined by the spiral and the center of the tone-arm. This presents two circles having differently positioned centers which must be dealt with. To coordinate the working of these two fixed centers, one travelling center having a radius in the form of a music piece selector stick is established on a piece selector stick which will be referred to later.

The grooves of the record are cut so as to make a spiral circle around the center spindle, and the stylus of the cartridge once placed in this groove follows the groove until the end of the spiral is reached. Different selections on a record are separated by a boundary zone of unrecorded grooves. Because the circles of the spiral have different centers, horizontal movement by the stylus of the tone-arm on the record is not a straight line, but is an arc. It is now known, however, that this arc can be replaced by the combination of a straight line and an arc starting from the center spindle of a turntable having a radius equivalent to the distance between the two fixed centers referred to above, the straight line reaching from the stylus of the tone-arm to the center spindle of the turntable, and the arc starting from the center spindle of the turntable.

These elements are combined to form a piece selector stick manually rotatable around the center spindle of the turntable. Along this straight line represented by the piece selector stick, the boundary zone grooves between the different selections on the record are indicated by needles protruding therefrom. A guide attachment indicating the position of the stylus is attached to the cartridge at the end of the tone-arm. This attachment is fixed to the cartridge by two stud bolts which are universally employed in many of the cartridges on the market. The piece selector stick is then made to rotate manually through its arc groove starting at the center spindle of the turntable so that indicating needles may be inserted on the straight line of the selector needle holder of the piece selector stick to closely contact the guide attachment of the cartridge on the tone-arm which has been raised by the tone-arm actuator lever. When the arc groove of the stick reaches the center spindle, the tone-arm is above the position of the selected selection's boundary. The stick is then disconnected and freed from the center spindle and the tone-arm by moving the stick outwardly therefrom. The tone-arm is lowered by the tone-arm actuator lever onto the moving record and the stylus enters the music groove of the record moving on the turntable.

BRIEF DESCRIPTION OF THE APPARATUS

Figure 1:
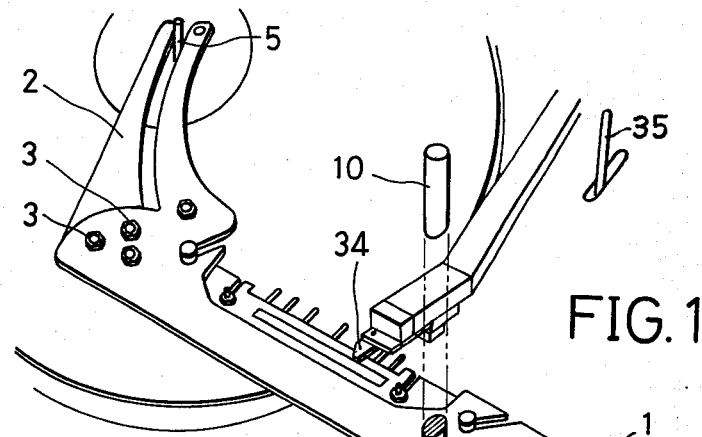
FIG. 1 shows perspective view of turn table, tone arm and piece selector stick with column hand and tone arm actuator lever in position before the tone arm and piece selector stick are made to function.

The following is a description of one embodiment of the invention, reference is made to the accompanying drawings in which:

Figure 1 shows a perspective view of the turntable, tone-arm and piece selector stick with the column hand and tone-arm actuator lever in the position before the tone arm and the piece selector stick are made to function.

Figure 2 shows another perspective view of the same, ready for lowering the tone-arm by the tone-arm actuator lever onto the moving record with one hand after the stick is moved outwardly by the other hand.

Figure 3 shows a top view of the piece selector.

Figure 3A shows the piece selector cut along the X-X in Figure 3.

Figure 4 shows a bottom view of the piece selector.

Figure 4A shows the piece selector cut along line Y-Y in Figure 4.

Figure 5 shows a top view of the radial adjuster of the selector needles.

Figure 6 shows a side view of the same as shown by Figure 5 with the selector needle holder in its position.

Figure 7 shows the base plate of the selector needle holder.

Figure 7A shows a side view of the same as shown in Figure 7 with the top cover in position.

Figure 8 shows the top view of the base plate of the selector needle holder with needle setter in the groove.

Figure 9 shows the top cover plate of the selector needle holder indicating the position of the needles for the selected music pieces on the record.

Figure 10 shows the needle setter with the needles in position.

Figure 11 shows how needles are fixed to the body of the needle setter on the record in a transparent jacket.

Figure 12 shows a general view of the bottom view of the cartridge with the stylus indicator attachment showing the two universally recognized stud bolts' holes.

Figure 13 shows a top view of the base board of the stylus indicator attachment.

Figure 14 shows a side view of the stylus indicator attachment properly fixed to its base board on the stylus indicator attachment.

Figure 15 shows a top view of Figure 14.

Figure 16 shows the trace of the working of the handle bar of the piece selector in relation to the turntable and the tone-arm.

DETAILED DESCRIPTION OF THE INVENTION

Reference is now made to Figures 3 and 4. The piece selector stick is principally made of two pieces 1, 2 of plastic of moderate thickness joined together by two bolts and nuts 3, 3. When these two pieces 1, 2 are joined, an arced opening 4 is formed between them. The center spindle 5 of the turntable is guided along this opening 4 when the piece selector stick 1 is pressed towards the center spindle 5. Along this opening 4, a step lining 6 is provided so that the center spindle 5 will always be guided by the piece selector stick 1. Next to this step lining 6, a synthetic rubber pad 7 in Figure 4, which is slightly thicker than the step lining 6, is glued directly to the piece selector 1 so that the record surface will not be damaged. Another element for protection of the record surface is the detachable protector 8 made of synthetic rubber or a thin board covered with cloth. On the surface of the piece selector stick 1, there are two groove cuts 9, 9 angled to receive the radial adjuster 12 of the selector needle holder 36 of Figure 5 which will be explained later. The piece selector stick 1 is cut along A, B, C, D, E, and F so that the needles of the needle setter 18 of Figure 8 can be placed in position as will be explained later. The piece selector stick 1 is manipulated by holding the straight end 11 with the left hand as shown in Figure 2 or by gripping the vertical column handle 10 with the same hand (not shown).

Referring to Figures 5 through 10, the radial adjuster 12 of the selector needle holder 36 has, near its longitudinal ends, stud bolts 13, 13 which slide along the grooves 9, 9 of the piece selector stick 1. From the nature of the slanted grooves 9, 9 by moving the stud bolts 13, 13 along the grooves, the radial adjuster 12 can be adjusted in its orientation radially as well as tangentially to the record, but radial adjustment is the working effect principally utilized. The radial adjuster 12 of the selector needle holder 36 also has towards its center, two transverse slots 14, 14 which take two stud bolts 16, 16 fitted through the base plate 15 which accomodates the needle setter 18 in its longitudinal groove 17. Needles 19 of thin wire, e.g. copper or stainless steel wire, are positioned by being glued, or otherwise maintained, along the length of the needle setter 18, thus indicating the boundary zone in front of the music selections on the record. It is also possible for the needles to be integrated into the longitudinal body of the needle setter 18 in one piece. As shown in Figure 8, the needle setter 18 is set in a groove 17 of the base plate 15 of the selector needle holder 36. The needle setter 18 can slide along the groove 17 for adjustment. A top cover plate 21 as shown in Figure 9 is placed in position on the base plate 15 of the selector needle holder 36 through holes 22 provided therein. On this cover plate 21 a label 23 or otherwise is provided to identify the position of each needle 19 when the piece selector stick is placed on a record. Although it is expected that a set of two needle setters 18 one for each side of a record will be provided by the record manufacturers, it is possible for owners of old records to prepare this needle setter 18 for their own usage.

Figure 11 shows how the owner can prepare his own needle setter. In order to protect the record, the record is now placed in the thin transparent plastic jacket 23 generally accompanying the record. The main plastic body of the needle setter 18 is temporarily placed on top of the jacket so as to radially coincide with the radius of the record. Adhesive tape 24 may be temporarily employed for holding the needle setter 18 in the right position on the plastic jacket 23. Then, the needles 19 are placed at the boundary space zone and glued onto the needle setter 18.

Reference is now made to Figures 12 through 15. In Figure 12, a cartridge 25 is interchangeably fixed to the plug-inare universal. Therefore, since the cartridge attachment 29 is provided with equivalent holes by which the cartridge attachment 29 can be attached to the cartridge 25, there is no difficulty in adapting this invention to any record player. In order to indicate the position of the stylus 37, a supplementary cartridge attachment 30 is, in turn, fixed to the cartridge attachment 29 by a bolt and nut through an adjustable transverse opening 32. The raised side 33 of the supplementary attachment 30 is the guide on which the needle 19 of the needle setter of Figure 10 depends for placing the tone-arm in position. The raised side 33 is in line with the outer circumference of the stylus 37. This raised side 33, also, is at right angles to the horizontal plane of the cartridge attachment 29. The protruding end 34 of the supplementar attachment 30 is a guide stopper for the tone-arm when the supplementary attachment 30 is in contact with the needle 19 of the needle setter 18.

In operation, the turntable is first energized to rotate, and the tone arm is raised by the tone-arm actuator lever 35 with the right hand while the end 11 of the piece selector stick 1 or the vertical column handle 10 is held in the left hand. Then, the piece selector stick 11 is inserted around the center spindle 5 of the turntable. Meanwhile, the piece selector stick 1 is turned towards the cartridge 25 of the freed tone-arm, and the required needle 19 of needle setter 18 in the piece selector stick is placed in close contact with the raised side 33 of the supplementary cartridge attachment 30 by lowering the arm actuator lever 35 with the right hand so that the protruding end 34 of the supplementary attachment 30 barely touches the top cover plate 21 of the selector needle holder 36. By moving the piece selector stick 1 along the arc of the groove 4 while pressing the tone-arm sideways and maintaining contact between the piece selector and the tone-arm, the stylus 37 is placed above the required boundary zone preceding the selected musical selection. The selector stick 1 is then freed from the tone-arm by clockwise rotation at the center spindle and by drawing it away from the center spindle. The movement of the vertical column handle 10 near the end 11 of the piece selector stick 1 is shown in Figure 16. By using this handle 10, it can be seen that this invention provides one travell center coordinating the workings of the two fixed centers of the turntable and the tone-arm. At point G of the cycle, the piece selector stick 1 contacts the tone-arm while the groove at the far end of the arc thereof surrounds the center spindle 5. At point H, the groove at its base end is in close contact with the center spindle 5. Stylus 37 of the tone-arm is then placed above the required position and the piece selector stick 1 is rotated clockwise to point K and drawn out to point M where the piece selector stick 1 is completely freed. Meanwhile, the tone-arm is lowered by the tone-arm actuator lever 35 onto the desired piece boundary zone preceding the desired musical selectic If the next selection of the record is to be played, the selector stick 1 may be moved towards point G for another cycle.

UNITED STATES PATENT OFFICE
CERTIFICATE OF CORRECTION

Patent No. 3,934,884                Dated January 27, 1976

Inventor(s)   Kosuke Matsukata                Page 1 of 4

It is certified that error appears in the above-identified patent and that said Letters Patent are hereby corrected as shown below:

On the cover sheet, the ABSTRACT should appear as shown on the attached sheet.

Column 1, line 6, beginning with "Conventional gramaphone" cancel all to and including "point G for another cycle1" in column 5, line 11, and insert the matter as shown on the attached sheets.

This certificate supersedes Certificate of Correction issued April 13, 1976.

Signed and Sealed this

Fifth Day of October 1976

[SEAL]

Attest:

RUTH C. MASON
Attesting Officer

C. MARSHALL DANN
Commissioner of Patents and Trademarks

Patent No. 3,934,884

ABSTRACT

An apparatus for positioning the tone-arm and stylus of a record player onto a desired boundary zone between selections of a phonograph record. The apparatus utilizes a piece selector stick with a grooved, angled end portion adapted to slide along the center spindle of the record player; a selection indicator which indicates the position of the boundary zones between the selections on the phonograph record, which is changeable for each record, and which is removably fitted to the selector stick; and a guide attachment which is attached to the end of the tone-arm for directing and retaining the tone-arm in the proper position on the selection indicator, so that the tone-arm may be positioned above the boundary zone preceding the desired selection on the record by moving the piece selector stick along the spindle of the record player.

PRECISION PIECE SELECTOR ON GRAMOPHONE RECORD

BACKGROUND OF THE INVENTION

Conventional record players can play three sizes of records, namely 12 (30 cm.), 10 (25.4 cm.) and 7 (17.5 cm.) inches in diameter. Nowadays 10-inch records are hardly seen, and even 7-inch records are not given as much publicity as in the past. Today, 12-inch records occupy a major portion of the market, while 7-inch records are still being used for regular juke boxes. The reason for this popularity of the 12-inch record may be due to the number of selections which may be recorded on one record and the high degree of fidelity possible with the 12-inch records. Music recorded on smaller diameter records is apt to be distorted as the needle approaches the center of the disc, however, further mechanical improvements achieved in the recording machine have enabled precision recording in closely positioned neighboring grooves of the recording spiral. While foreseeing difficulties in some respects in increasing the diameter of records beyond the 12 inches (30 cm.) of the present day, nobody can deny the possibility of the enlargement to 14 inches (35 cms.) or more as is the case of the computers' magnetic discs.

When such a record in realized, a higher degree of fidelity will be enjoyed besides increasing the number or length of selections possible on one record, but there will be many problems to overcome. The ability to easily select the desired pieces recorded on one side of the record is one demand to be met by both the makers of the record players and the record manufacturers. Unfortunately, record players are handled by mechanical engineers and records are controlled by plastics engineers, and each is independent of the other in the fields of business and engineering. A further problem is that listeners have become accustomed to thinking that in order to make a selection on a record, visual effort and manual positioning are necessary to place the tone arm on the right spot on the record. Finally, any electrical apparatuses near the pick-up stylus will create a flux distortion causing magnetic disturbances, thereby prejudicing the high fidelity of the sound produced. These circumstances have left this delicate area undeveloped and in a no-man's land position, neglected by both the makers of the record players and record manufacturers.

In some fields of engineering, mechanical precision is more complete than electrical contrivance, especially when the time necessary for its manipulation can be overlooked to a certain extent. Recent high standards of record cutting permit neglecting the horizontal deviation of the course traced by the stylus to the extent of the boundary space zone between two neighboring musical selections on the record. This means that this space can absorb the above-referred to horizontal deviation of the tracing of the stylus. Therefore, if the stylus can be placed in this space with the precision possible with the present techniques, the stylus can play the selection right from the beginning. This precision placing of the stylus is now achieved by this invention, so that any musical selection out of as many as 14 selections on one side of a record can be selected, and the selection can be repeated as often as the listener wishes. Where a record changer is used, any selection out of the many records in the stack on the turntable can be selected without requiring access to the end of each record which is difficult to see.

SUMMARY OF THE INVENTION

Two centers must first be considered, the center of the turntable defined by the spiral and the center of the tone arm. This presents two circles having differently positioned centers which must be dealt with. To coordinate the working of these two fixed centers, one travelling center having a radius in the form of a music piece selector stick is established on a piece selector stick which will be referred to later.

The grooves of the record are cut so as to make a spiral circle around the center spindle, and the stylus of the cartridge once placed in this groove follows the groove until the end of the spiral is reached. Different selections on a record are separated by a boundary zone of unrecorded grooves. Because the circles of the spiral have different centers, horizontal movement by the stylus of the tone arm on the record, is not a straight line, but is an arc. It is now known, however, that this arc can be replaced by the combination of a straight line and an arc starting from the center spindle of a turntable having a radius equivalent to the distance between the two fixed centers referred to above, the straight line reaching from the stylus of the tone arm to the center spindle of the turntable, and the arc starting from the center spindle of the turntable.

These elements are combined to form a piece selector stick manually rotatable around the center spindle of the turntable. Along this straight line represented by the piece selector stick, the boundary zone grooves between the different selections on the record are indicated by needles protruding therefrom. A guide attachment indicating the position of the stylus is attached to the cartridge at the end of the tone arm. This attachment is fixed to the cartridge by two stud bolts which are universally employed in many of the cartridges on the market. The piece selector stick is then made to rotate manually through its arc groove starting at the center spindle of the turntable so that indicating needles may be inserted on the straight line of the selector needle holder of the piece selector stick to closely contact the guide attachment of the cartridge on the tone-arm which has been raised by the tone-arm actuator lever. When the arc groove of the stick reaches the center spindle, the tone arm is above the position of the selected selection's boundary. The stick is then disconnected and freed from the center spindle and the tone arm by moving the stick outwardly therefrom. The tone arm is lowered by the tone arm actuator lever onto the moving record and the stylus enters the music groove of the record moving on the turntable.

BRIEF DESCRIPTION OF THE APPARATUS

The following is a description of one embodiment of the invention, reference is made to the accompanying drawings in which:

FIG. 1 shows a perspective view of the turntable, tone arm and piece selector stick with the column hand and tone arm actuator lever in the position before the tone arm and the piece selector stick are made to function.

FIG. 2 shows another perspective view of the same, ready for lowering the tone arm by the tone arm actuator lever onto the moving record with one hand after the stick is moved outwardly by the other hand.

FIG. 3 shows a top view of the piece selector.

FIG. 3A shows the piece selector cut along the X-X in FIG. 3.

FIG. 4 shows a bottom view of the piece selector.

FIG. 4A shows the piece selector cut along line Y-Y in FIG. 4.

FIG. 5 shows a top view of the radial adjuster of the selector needles.

FIG. 6 shows a side view of the same as shown by FIG. 5 with the selector needle holder in its position.

FIG. 7 shows the base plate of the selector needle holder.

FIG. 7A shows a side view of the same as shown in FIG. 7 with the top cover in position.

FIG. 8 shows the top view of the base plate of the selector needle holder with needle setter in the groove.

FIG. 9 shows the top cover plate of the selector needle holder indicating the position of the needles for the selected music pieces on the record.

FIG. 10 shows the needle setter with the needles in position.

FIG. 11 shows how needles are fixed to the body of the needle setter on the record in a transparent jacket.

FIG. 12 shows a general view of the bottom view of the cartridge with the stylus indicator attachment showing the two universally recognized stud bolts' holes.

FIG. 13 shows a top view of the base board of the stylus indicator attachment.

FIG. 14 shows a side view of the stylus indicator attachment properly fixed to its base board on the stylus indicator attachment.

FIG. 15 shows a top view of FIG. 14.

FIG. 16 shows the trace of the working of the handle bar of the piece selector in relation to the turntable and the tone-arm.

DETAILED DESCRIPTION OF THE INVENTION

Reference is now made to FIGS. 3 and 4. The piece selector stick is principally made of two pieces 1, 2 of plastic of moderate thickness joined together by two bolts and nuts 3, 3. When these two pieces 1, 2 are joined, an arced opening 4 is formed between them. The center spindle 5 of the turntable is guided along this opening 4 when the piece selector stick 1 is pressed towards the center spindle 5. Along this opening 4, a step lining 6 is provided so that the center spindle 5 will always be guided by the piece selector stick 1. Next to this step lining 6, a synthetic rubber pad 7 in FIG. 4, which is slightly thicker than the step lining 6, is glued directly to the piece selector 1 so that the record surface will not be damaged. Another element for protection of the record surface is the detachable protector 8 made of synthetic rubber or a thin board covered with cloth. On the surface of the piece selector stick 1, there are two groove cuts 9, 9 angled to receive the radial adjuster 12 of the selector needle holder 36 of FIG. 5 which will be explained later. The piece selector stick 1 is cut along A, B, C, D, E, and F so that the needles of the needle setter 18 of FIG. 8 can be placed in position as will be explained later. The piece selector stick 1 is manipulated by holding the straight end 11 with the left hand as shown in FIG. 2 or by gripping the vertical column handle 10 with the same hand (not shown).

Referring to FIGS. 5 through 10, the radial adjuster 12 of the selector needle holder 36 has, near its longitudinal ends, stud bolts 13, 13 which slide along the grooves 9, 9 of the piece selector stick 1. From the nature of the slanted grooves 9, 9 by moving the stud bolts 13, 13 along the grooves, the radial adjuster 12 can be adjusted in its orientation radially as well as tangentially to the record, but radial adjustment is the working effect principally utilized. The radial adjuster 12 of the selector needle holder 36 also has towards its center, two transverse slots 14, 14 which take two stud bolts 16, 16 fitted through the base plate 15 which accommodates the needle setter 18 in its longitudinal groove 17. Needles 19 of thin wire, e.g., copper or stainless steel wire, are positioned by being glued, or otherwise maintained, along the length of the needle setter 18, thus indicating the boundary zone in front of the music selections on the record. It is also possible for the needles to be integrated into the longitudinal body of the needle setter 18 in one piece. As shown in FIG. 8, the needle setter 18 is set in a groove 17 of the base plate 15 of the selector needle holder 36. The needle setter 18 can slide along the groove 17 for adjustment. A top cover plate 21 as shown in FIG. 9 is placed in position on the base plate 15 of the selector needle holder 36 through holes 22 provided therein. On this cover plate 21 a label 23 or otherwise is provided to identify the position of each needle 19 when the piece selector stick is placed on a record.

Although it is expected that a set of two needle setters 18 one for each side of a record will be provided by the record manufacturers, it is possible for owners of old records to prepare this needle setter 18 for their own usage.

FIG. 11 shows how the owner can prepare his own needle setter. In order to protect the record, the record is now placed in the thin transparent plastic jacket 23 generally accompanying the record. The main plastic body of the needle setter 18 is temporarily placed on top of the jacket so as to radially coincide with the radius of the record. Adhesive tape 24 may be temporarily employed for holding the needle setter 18 in the right position on the plastic jacket 23. Then, the needles 19 are placed at the boundary space zone and glued onto the needle setter 18.

Reference is now made to FIGS. 12 through 15. In FIG. 12, a cartridge 25 is interchangeably fixed to the plug-in-head 26 of a tone arm by two stud bolts 27. These stud bolts 27 are universal. Therefore, since the cartridge attachment 29 is provided with equivalent holes by which the cartridge attachment 29 can be attached to the cartridge 25, there is no difficulty in adapting this invention to any record player. In order to indicate the position of the stylus 37, a supplementary cartridge attachment 30 is, in turn, fixed to the cartridge attachment 29 by a bolt and nut through an adjustable transverse opening 32. The raised side 33 of the supplementary attachment 30 is the guide on which the needle 19 of the needle setter of FIG. 10 depends for placing the tone-arm in position. The raised side 33 is in line with the outer circumference of the stylus 37. This raised side 33, also, is at right angles to the horizontal plane of the cartridge attachment 29. The protruding end 34 of the supplementary attachment 30 is a guide stopper for the tone-arm when the supplementary attachment 30 is in contact with the needle 19 of the needle setter 18.

In operation, the turntable is first energized to rotate, and the tone arm is raised by the tone arm actuator lever 35 with the right hand while the end 11 of the piece selector stick 1 or the vertical column handle 10 is held in the left hand. Then, the piece selector stick 11 is inserted around the center spindle 5 of the turntable. Meanwhile, the piece selector stick 1 is turned towards the cartridge 25 of the freed tone arm, and the required needle 19 of needle setter 18 in the piece selector stick 1 is placed in close contact with the raised side 33 of the supplementary cartridge attachment 30 by lowering the arm actuator lever 35 with the right hand so that the protruding end 34 of the supplementary attachment 30 barely touches the top cover plate 21 of the selector needle holder 36. By moving the piece selector stick 1 along the arc of the groove 4 while pressing the tone arm sideways and maintaining contact between the piece selector and the tone arm, the stylus 37 is placed above the required boundary zone preceding the selected musical selection. The selector stick 1 is then freed from the tone arm by clockwise rotation at the center spindle and by drawing it away from the center spindle. The movement of the vertical column handle 10 near the end 11 of the piece selector stick 1 is shown in FIG. 16. By using this handle 10, it can be seen that this invention provides one travelling center coordinating the workings of the two fixed centers of the turntable and the tone arm. At point G of the cycle, the piece selector stick 1 contacts the tone arm while the groove at the far end of the arc thereof surrounds the center spindle 5. At point H, the groove at its base end is in close contact with the center spindle 5. Stylus 37 of the tone arm is then placed above the required position and the piece selector stick 1 is rotated clockwise to point K and drawn out to point M where the piece selector stick 1 is completely freed. Meanwhile, the tone arm is lowered by the tone arm actuator lever 35 onto the desired piece boundary zone preceding the desired musical selection. If the next selection of the record is to be played, the selector stick 1 may be moved towards point G for another cycle.

UNITED STATES PATENT OFFICE
CERTIFICATE OF CORRECTION

Patent No. 3,934,884  Dated January 27, 1976

Inventor(s) Kosuke Matsukata  Page 1 of 3

It is certified that error appears in the above-identified patent and that said Letters Patent are hereby corrected as shown below:

Column 1, line 6, beginning with "Conventional gramaphone" cancel all to and including "point G for another cycle1" in column 5, line 11, and insert the matter as shown on the attached sheets.

This certificate supersedes Certificate of Correction issued October 5, 1976.

Signed and Sealed this

Eighteenth Day of January 1977

[SEAL]

Attest:

RUTH C. MASON
*Attesting Officer*

C. MARSHALL DANN
*Commissioner of Patents and Trademarks*

PRECISION PIECE SELECTOR ON GRAMOPHONE RECORD

BACKGROUND OF THE INVENTION

Conventional record players can play three sizes of records, namely 12 (30 cm.), 10 (25.4 cm.) and 7 (17.5 cm.) inches in diameter. Nowadays 10-inch records are hardly seen, and even 7-inch records are not given as much publicity as in the past. Today, 12-inch records occupy a major portion of the market, while 7-inch records are still being used for regular juke boxes. The reason for this popularity of the 12-inch record may be due to the number of selections which may be recorded on one record and the high degree of fidelity possible with the 12-inch records. Music recorded on smaller diameter records is apt to be distorted as the needle approaches the center of the disc, however, further mechanical improvements achieved in the recording machine have enabled precision recording in closely positioned neighboring grooves of the recording spiral. While foreseeing difficulties in some respects in increasing the diameter of records beyond the 12 inches (30 cm.) of the present day, nobody can deny the possibility of the enlargement to 14 inches (35 cms.) or more as is the case of the computers' magnetic discs.

When such a record in realized, a higher degree of fidelity will be enjoyed besides increasing the number or length of selections possible on one record, but there will be many problems to overcome. The ability to easily select the desired pieces recorded on one side of the record is one demand to be met by both the makers of the record players and the record manufacturers. Unfortunately, record players are handled by mechanical engineers and records are controlled by plastics engineers, and each is independent of the other in the fields of business and engineering. A further problem is that listeners have become accustomed to thinking that in order to make a selection on a record, visual effort and manual positioning are necessary to place the tone arm on the right spot on the record. Finally, any electrical apparatuses near the pick-up stylus will create a flux distortion causing magnetic disturbances, thereby prejudicing the high fidelity of the sound produced. These circumstances have left this delicate area undeveloped and in a no-man's land position, neglected by both the makers of the record players and record manufacturers.

In some fields of engineering, mechanical precision is more complete than electrical contrivance, especially when the time necessary for its manipulation can be overlooked to a certain extent. Recent high standards of record cutting permit neglecting the horizontal deviation of the course traced by the stylus to the extent of the boundary space zone between two neighboring musical selections on the record. This means that this space can absorb the above-referred to horizontal deviation of the tracing of the stylus. Therefore, if the stylus can be placed in this space with the precision possible with the present techniques, the stylus can play the selection right from the beginning. This precision placing of the stylus is now achieved by this invention, so that any musical selection out of as many as 14 selections on one side of a record can be selected, and the selection can be repeated as often as the listener wishes. Where a record changer is used, any selection out of the many records in the stack on the turntable can be selected without requiring access to the end of each record which is difficult to see.

SUMMARY OF THE INVENTION

Two centers must first be considered, the center of the turntable defined by the spiral and the center of the tone arm. This presents two circles having differently positioned centers which must be dealt with. To coordinate the working of these two fixed centers, one travelling center having a radius in the form of a music piece selector stick is established on a piece selector stick which will be referred to later.

The grooves of the record are cut so as to make a spiral circle around the center spindle, and the stylus of the cartridge once placed in this groove follows the groove until the end of the spiral is reached. Different selections on a record are separated by a boundary zone of unrecorded grooves. Because the circles of the spiral have different centers, horizontal movement by the stylus of the tone arm on the record, is not a straight line, but is an arc. It is now known, however, that this arc can be replaced by the combination of a straight line and an arc starting from the center spindle of a turntable having a radius equivalent to the distance between the two fixed centers referred to above, the straight line reaching from the stylus of the tone arm to the center spindle of the turntable, and the arc starting from the center spindle of the turntable.

These elements are combined to form a piece selector stick manually rotatable around the center spindle of the turntable. Along this straight line represented by the piece selector stick, the boundary zone grooves between the different selections on the record are indicated by needles protruding therefrom. A guide attachment indicating the position of the stylus is attached to the cartridge at the end of the tone arm. This attachment is fixed to the cartridge by two stud bolts which are universally employed in many of the cartridges on the market. The piece selector stick is then made to rotate manually through its arc groove starting at the center spindle of the turntable so that indicating needles may be inserted on the straight line of the selector needle holder of the piece selector stick to closely contact the guide attachment of the cartridge on the tone-arm which has been raised by the tone-arm actuator lever. When the arc groove of the stick reaches the center spindle, the tone arm is above the position of the selected selection's boundary. The stick is then disconnected and freed from the center spindle and the tone arm by moving the stick outwardly therefrom. The tone arm is lowered by the tone arm actuator lever onto the moving record and the stylus enters the music groove of the record moving on the turntable.

BRIEF DESCRIPTION OF THE APPARATUS

The following is a description of one embodiment of the invention, reference is made to the accompanying drawings in which:

FIG. 1 shows a perspective view of the turntable, tone arm and piece selector stick with the column hand and tone arm actuator lever in the position before the tone arm and the piece selector stick are made to function.

FIG. 2 shows another perspective view of the same, ready for lowering the tone arm by the tone arm actuator lever onto the moving record with one hand after the stick is moved outwardly by the other hand.

FIG. 3 shows a top view of the piece selector.

FIG. 3A shows the piece selector cut along the X-X in FIG. 3.

FIG. 4 shows a bottom view of the piece selector.

FIG. 4A shows the piece selector cut along line Y-Y in FIG. 4.

FIG. 5 shows a top view of the radial adjuster of the selector needles.

FIG. 6 shows a side view of the same as shown by FIG. 5 with the selector needle holder in its position.

FIG. 7 shows the base plate of the selector needle holder.

FIG. 7A shows a side view of the same as shown in FIG. 7 with the top cover in position.

FIG. 8 shows the top view of the base plate of the selector needle holder with needle setter in the groove.

FIG. 9 shows the top cover plate of the selector needle holder indicating the position of the needles for the selected music pieces on the record.

FIG. 10 shows the needle setter with the needles in position.

FIG. 11 shows how needles are fixed to the body of the needle setter on the record in a transparent jacket.

FIG. 12 shows a general view of the bottom view of the cartridge with the stylus indicator attachment showing the two universally recognized stud bolts' holes.

FIG. 13 shows a top view of the base board of the stylus indicator attachment.

FIG. 14 shows a side view of the stylus indicator attachment properly fixed to its base board on the stylus indicator attachment.

FIG. 15 shows a top view of FIG. 14.

FIG. 16 shows the trace of the working of the handle bar of the piece selector in relation to the turntable and the tone-arm.

DETAILED DESCRIPTION OF THE INVENTION

Reference is now made to FIGS. 3 and 4. The piece selector stick is principally made of two pieces 1, 2 of plastic of moderate thickness joined together by two bolts and nuts 3, 3. When these two pieces 1, 2 are joined, an arced opening 4 is formed between them. The center spindle 5 of the turntable is guided along this opening 4 when the piece selector stick 1 is pressed towards the center spindle 5. Along this opening 4, a step lining 6 is provided so that the center spindle 5 will always be guided by the piece selector stick 1. Next to this step lining 6, a synthetic rubber pad 7 in FIG. 4, which is slightly thicker than the step lining 6, is glued directly to the piece selector 1 so that the record surface will not be damaged. Another element for protection of the record surface is the detachable protector 8 made of synthetic rubber or a thin board covered with cloth. On the surface of the piece selector stick 1, there are two groove cuts 9, 9 angled to receive the radial adjuster 12 of the selector needle holder 36 of FIG. 5 which will be explained later. The piece selector stick 1 is cut along A, B, C, D, E, and F so that the needles of the needle setter 18 of FIG. 8 can be placed in position as will be explained later. The piece selector stick 1 is manipulated by holding the straight end 11 with the left hand as shown in FIG. 2 or by gripping the vertical column handle 10 with the same hand (not shown).

Referring to FIGS. 5 through 10, the radial adjuster 12 of the selector needle holder 36 has, near its longitudinal ends, stud bolts 13, 13 which slide along the grooves 9, 9 of the piece selector stick 1. From the nature of the slanted grooves 9, 9 by moving the stud bolts 13, 13 along the grooves, the radial adjuster 12 can be adjusted in its orientation radially as well as tangentially to the record, but radial adjustment is the working effect principally utilized. The radial adjuster 12 of the selector needle holder 36 also has towards its center, two transverse slots 14, 14 which take two stud bolts 16, 16 fitted through the base plate 15 which accommodates the needle setter 18 in its longitudinal groove 17. Needles 19 of thin wire, e.g., copper or stainless steel wire, are positioned by being glued, or otherwise maintained, along the length of the needle setter 18, thus indicating the boundary zone in front of the music selections on the record. It is also possible for the needles to be integrated into the longitudinal body of the needle setter 18 in one piece. As shown in FIG. 8, the needle setter 18 is set in a groove 17 of the base plate 15 of the selector needle holder 36. The needle setter 18 can slide along the groove 17 for adjustment. A top cover plate 21 as shown in FIG. 9 is placed in position on the base plate 15 of the selector needle holder 36 through holes 22 provided therein. On this cover plate 21 a label 23 or otherwise is provided to identify the position of each needle 19 when the piece selector stick is placed on a record.

Although it is expected that a set of two needle setters 18 one for each side of a record will be provided by the record manufacturers, it is possible for owners of old records to prepare this needle setter 18 for their own usage.

FIG. 11 shows how the owner can prepare his own needle setter. In order to protect the record, the record is now placed in the thin transparent plastic jacket 23 generally accompanying the record. The main plastic body of the needle setter 18 is temporarily placed on top of the jacket so as to radially coincide with the radius of the record. Adhesive tape 24 may be temporarily employed for holding the needle setter 18 in the right position on the plastic jacket 23. Then, the needles 19 are placed at the boundary space zone and glued onto the needle setter 18.

Reference is now made to FIGS. 12 through 15. In FIG. 12, a cartridge 25 is interchangeably fixed to the plug-in-head 26 of a tone arm by two stud bolts 27. These stud bolts 27 are universal. Therefore, since the cartridge attachment 29 is provided with equivalent holes by which the cartridge attachment 29 can be attached to the cartridge 25, there is no difficulty in adapting this invention to any record player. In order to indicate the position of the stylus 37, a supplementary cartridge attachment 30 is, in turn, fixed to the cartridge attachment 29 by a bolt and nut through an adjustable transverse opening 32. The raised side 33 of the supplementary attachment 30 is the guide on which the needle 19 of the needle setter of FIG. 10 depends for placing the tone-arm in position. The raised side 33 is in line with the outer circumference of the stylus 37. This raised side 33, also, is at right angles to the horizontal plane of the cartridge attachment 29. The protruding end 34 of the supplementary attachment 30 is a guide stopper for the tone-arm when the supplementary attachment 30 is in contact with the needle 19 of the needle setter 18.

In operation, the turntable is first energized to rotate, and the tone arm is raised by the tone arm actuator lever 35 with the right hand while the end 11 of the piece selector stick 1 or the vertical column handle 10 is held in the left hand. Then, the piece selector stick 11 is inserted around the center spindle 5 of the turntable. Meanwhile, the piece selector stick 1 is turned towards the cartridge 25 of the freed tone arm, and the required needle 19 of needle setter 18 in the piece selector stick 1 is placed in close contact with the raised side 33 of the supplementary cartridge attachment 30 by lowering the arm actuator lever 35 with the right hand so that the protruding end 34 of the supplementary attachment 30 barely touches the top cover plate 21 of the selector needle holder 36. By moving the piece selector stick 1 along the arc of the groove 4 while pressing the tone arm sideways and maintaining contact between the piece selector and the tone arm, the stylus 37 is placed above the required boundary zone preceding the selected musical selection. The selector stick 1 is then freed from the tone arm by clockwise rotation at the center spindle and by drawing it away from the center spindle. The movement of the vertical column handle 10 near the end 11 of the piece selector stick 1 is shown in FIG. 16. By using this handle 10, it can be seen that this invention provides one travelling center coordinating the workings of the two fixed centers of the turntable and the tone arm. At point G of the cycle, the piece selector stick 1 contacts the tone arm while the groove at the far end of the arc thereof surrounds the center spindle 5. At point H, the groove at its base end is in close contact with the center spindle 5. Stylus 37 of the tone arm is then placed above the required position and the piece selector stick 1 is rotated clockwise to point K and drawn out to point M where the piece selector stick 1 is completely freed. Meanwhile, the tone arm is lowered by the tone arm actuator lever 35 onto the desired piece boundary zone preceding the desired musical selection. If the next selection of the record is to be played, the selector stick 1 may be moved towards point G for another cycle.